Feb. 15, 1966    A. R. KENYON    3,234,630

METHOD OF PRODUCING A CONDUIT

Filed Sept. 4, 1962

United States Patent Office 3,234,630
Patented Feb. 15, 1966

3,234,630
METHOD OF PRODUCING A CONDUIT
Albert Raymond Kenyon, Harwell, England, assignor to United Kingdom Atomic Energy Authority, London, England
Filed Sept. 4, 1962, Ser. No. 221,041
Claims priority, application Great Britain, Sept. 7, 1961, 32,105/61
5 Claims. (Cl. 29—155.5)

This invention relates to a method of producing an electrically insulating conduit having an electrode embedded in its inner surface and has one application in the manufacture of an electrolytic cell for a known type of moisture meter.

In such a cell it is customary to secure electrodes .001 inch in diameter to the inner surface of a conduit 6 feet long and .01 inch in diameter and to subsequently coat the internal surface of the assembly with a lining material. Difficulties may arise with the said lining material due to the corrugations produced in the internal surface of the assembly by the known method of inserting the electrode.

It is an object of the present invention to provide a method of producing a conduit having an electrode embedded in its inner surface whereby the inner surface is substantially smooth and free of corrugations.

According to the invention a method of producing a conduit having an electrode embedded in its inner surface comprises positioning the electrode on a former by means of a spacing material, encasing the exterior of the former and electrode assembly with a material compatible with the spacing material, heating the assembly to a temperature at which the encasing material and the spacing material fuse and subsequently extracting the former.

Preferably the spacing material is filamentous and wound on to the former with the electrode in the form of a multi-start helix and the encasing material is in tubular form and drawn down on to the electrode and former to encsae the assembly. The spacing and encasing material may be glass and the former may comprise a copper rod. The rod may be hollow and extracted from the assembly by means of an acid.

To enable the nature of the invention to be more readily understood, the invention will be described by way of example with reference to the accompanying drawing which illustrates stages in the manufacture of an electrolytic cell for a moisture meter.

Figure 1:
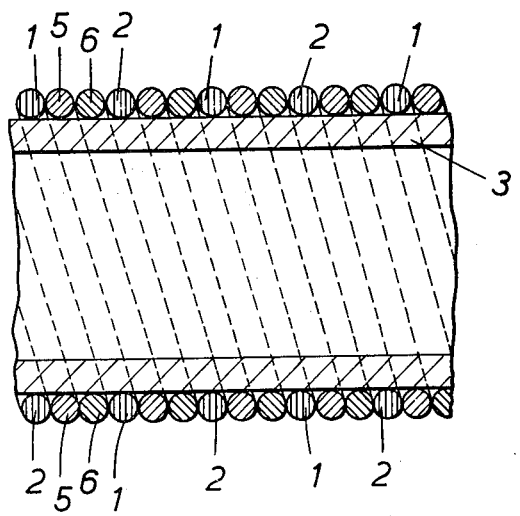
FIG. 1 is a sectional elevation of part of a former assembly showing electrodes and spacing filaments in position.

Referring to FIG. 1, platinum electrodes 1 and 2 of .001 inch diameter are wound on to a hollow copper former 3 of .01 inch external diameter and 6 feet long. The electrodes 1 and 2 are separated by spacing material in the form of glass filaments 5 and 6. The filaments are .001 inch in diameter and wound on the former 3 with the electrodes such that the electrodes and filaments together form a multi-start helix extending along the length of the former.

A glass tube 7 of similar composition to the filaments and having a bore slightly larger than the diameter of the former and electrode assembly is heated and drawn over and down on to the exterior surface of the assembly thus encasing the electrodes.

The whole assembly is heated to a temperature at which the encasing glass tube 7 fuses to the filaments 5 and 6 and the glass tube can be further drawn down on the former at this stage.

Upon cooling, the former is extracted by mechanical means i.e. by stretching and withdrawing, or the former may be chemically removed, for example by nitric acid.

Figure 2:
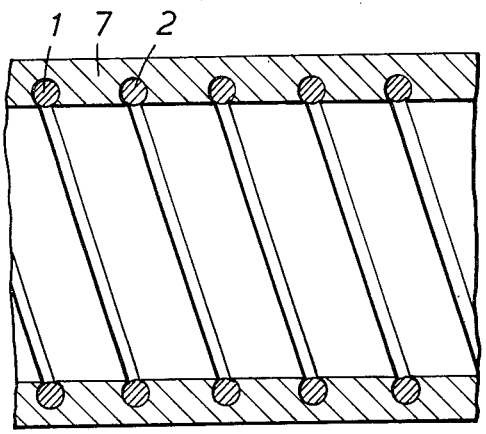
FIG. 2 is a similar sectional elevation showing the encased electrodes after extraction of the former from the assembly.

When the former has been extracted, as shown in FIG. 2 the inner surface of the conduit thus formed is substantially smooth and suitable for coating with a phosphoric acid in the next stages of manufacture.

Glasses having different compositions may be used for the spacing filaments and the encasing tube, provided that the coefficients of thermal expansions of the materials are similar and that a homogeneous glass structure is formed which does not crack on cooling.

It will be appreciated that thermosetting materials other than glass may be used and that the material of the former is not restricted to copper.

I claim:

1. A method of producing a conduit having an electrode embedded in its inner surface comprising positioning the electrode on a former by means of a filamentous spacing material wound on to the former with the electrode in the form of a multi-start helix, encasing the exterior of the former and electrode assembly with a material compatible with the spacing material, heating the assembly to a temperature at which the encasing material and the spacing material fuse and subsequently extracting the former.

2. A method of producing a conduit having an electrode embedded in its inner surface comprising positioning the electrode on a former by means of a filamentous spacing material wound on to the former with the electrode in the form of a multi-start helix, encasing the exterior of the former and electrode assembly within a tube of a material compatible with the spacing material, drawing down said tube on to the electrode and former, heating the assembly to a temperature at which the encasing material and the spacing material fuse and subsequently extracting the former.

3. A method of producing a conduit having an electrode embedded in its inner surface comprising positioning the electrode on a former and spacing apart the windings of said electrode by means of a glass filament wound on to the former with the electrode in the form of a multi-start helix, encasing the exterior of the former and electrode assembly within a glass sheath, heating the assembly to a temperature at which the sheath and the spacing filament fuse and subsequently extracting the former.

4. A method of producing an electrolytic cell comprising positioning and spacing apart a pair of electrodes on a former by means of a filamentous spacing material wound on to the former with the electrodes in the form of a multi-start helix, encasing the exterior of the former and electrode assembly within a tube of a material compatible with the spacing material, drawing down said tube on to the electrode and former, heating the assembly to a temperature at which the encasing material and the spacing material fuse, extracting the former and coating the interior surface of the assembly with a phosphoric acid.

5. A method of producing an electrolytic cell comprising positioning and spacing apart a pair of platinum electrodes on a hollow copper former by means of a glass filament wound on to the former with the electrodes in the form of a multi-start helix and encasing the exterior of the former and electrode assembly within a glass tube, heating the assembly and drawing down said tube on to the electrode and former, re-heating the assembly to a temperature at which the encasing material and the spacing material fuse, extracting the former by means of an acid and subsequently coating the interior surface of the assembly with a phosphoric acid.

References Cited by the Examiner

UNITED STATES PATENTS 2,287,460    6/1942    Wagenhals et al. _ 29—155.68 XR

FOREIGN PATENTS 11,993    5/1913    Great Britain.

WHITMORE A. WILTZ, *Primary Examiner.*